United States Patent
Zhou et al.

(10) Patent No.: US 6,438,158 B1
(45) Date of Patent: *Aug. 20, 2002

(54) METHOD AND APPARATUS FOR IMPLEMENTING ENHANCED MULTIPLE MODULUS CONVERSION TECHNIQUES IN A SIGNAL POINT MAPPING CONTEXT

(75) Inventors: Zhenyu Zhou, Irvine; Xuming Zhang, Mission Viejo; Yuanjie Chen, Milpitas, all of CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/476,856

(22) Filed: Jan. 3, 2000

Related U.S. Application Data

(63) Continuation of application No. 09/013,671, filed on Jan. 26, 1998, now Pat. No. 6,034,991.

(51) Int. Cl.[7] ................................................. H04L 5/16
(52) U.S. Cl. ...................... 375/222; 375/242; 375/261; 375/280; 375/295; 370/420
(58) Field of Search .................................. 375/222, 261, 375/295, 280, 242, 216, 223, 296, 259; 370/420; 708/491

(56) References Cited

U.S. PATENT DOCUMENTS

| | | | |
|---|---|---|---|
| 5,056,112 A | 10/1991 | Wei | 375/261 |
| 5,103,227 A | 4/1992 | Betts | 341/61 |

(List continued on next page.)

FOREIGN PATENT DOCUMENTS

| | | |
|---|---|---|
| EP | 0725487 A2 | 8/1996 |
| EP | 0852438 A2 | 7/1998 |
| WO | WO 92/17972 | 10/1992 |
| WO | WO 98/39883 | 9/1998 |

OTHER PUBLICATIONS

Mixed Base Mapping, Telecommunications Industry Association, Richard G. C. Williams, pp. 1–3.
Multiple Modulus Conversion for Robbed Bit Signaling Channels, Telecommunications Industry Association, Mar. 4–5, 1997.
Motorola Information System Group (USA), Signal Mapping and Shaping for V. Fast, Jun. 92, pp. 1–13.
DSP Implementation Considerations in High–Speed Telephone Modems, DSP Conference Proceedings, B. Hodgkiss, Dec. 3, 1997, pp. 77–84.

*Primary Examiner*—Stephen Chin
*Assistant Examiner*—Shuwang Liu
(74) *Attorney, Agent, or Firm*—Farjami & Farjami LLP

(57) ABSTRACT

The present invention relates to multiple modulus conversion (MMC) techniques for mapping data in a pulse code modulation (PCM) modem system. In accordance with the present invention, signal point constellations are arranged to receive the output indices generated by the MMC procedure such that the probability of transmission of higher power codewords is relatively low compared to the probability of transmission of lower power codewords, while maintaining the same or larger minimum distance between signal points. In addition, the present invention provides techniques for obtaining the probability of occurrence for each constellation or signal point associated with a given data communication session and for determining the theoretical average transmit power associated with a given set of signal point constellations and MMC parameters. In addition, the present invention provides a method for estimating a reasonable upper bound for the average transmit power associated with a given set of signal point constellations and MMC parameters. The present invention is also capable of transmitting the codewords defined by an MMC procedure in a specific order that may be optimized in accordance with a particular cost function associated with the modem system.

15 Claims, 5 Drawing Sheets

U.S. PATENT DOCUMENTS

| | | | |
|---|---|---|---|
| 5,222,077 A | 6/1993 | Krishnan | 375/280 |
| 5,230,010 A | 7/1993 | Betts et al. | 375/261 |
| 5,280,503 A | 1/1994 | Betts et al. | 375/377 |
| 5,428,641 A | 6/1995 | Long | 375/295 |
| 5,475,711 A | 12/1995 | Betts et al. | 375/298 |
| 5,598,435 A | 1/1997 | Williams | 375/251 |
| 5,684,834 A | 11/1997 | Betts et al. | 375/240 |
| 5,825,816 A | 10/1998 | Cole et al. | 375/222 |
| 5,838,724 A | 11/1998 | Cole et al. | 375/222 |
| 5,844,944 A | 12/1998 | Betts et al. | 375/298 |
| 5,859,877 A | 1/1999 | Betts et al. | 375/298 |
| 5,862,184 A | 1/1999 | Goldstein et al. | 375/295 |
| 6,065,030 A * | 5/2000 | Zhang | 708/491 |
| 6,084,883 A * | 7/2000 | Noreell et al. | 370/420 |
| 6,084,915 A * | 7/2000 | Williams | 375/242 |
| 6,307,892 B1 * | 10/2001 | Jones et al. | 375/296 |

* cited by examiner

METHOD AND APPARATUS FOR IMPLEMENTING ENHANCED MULTIPLE MODULUS CONVERSION TECHNIQUES IN A SIGNAL POINT MAPPING CONTEXT

This application is a continuation of application Ser. No. 09/013,671, filed Jan. 26, 1998, now U.S. Pat. No. 6,034,991, disclosure of which is incorporated herein by reference.

FIELD OF THE INVENTION

The present invention relates generally to the use of multiple modulus conversion (MMC) techniques for mapping data in a pulse code modulation (PCM) modem system. In particular, the present invention relates to techniques that contemplate transmit power parameters where MMC mapping procedures are employed.

BACKGROUND OF THE INVENTION

The new generation of 56 kbps modem systems utilize a number of techniques that differ from conventional analog modems (e.g., modems compatible with the V.34 standard). 56 kbps modem systems employ pulse code modulation (PCM) technology to facilitate higher downstream transmission data rates to an end user. For example, FIG. 1 depicts a conceptual diagram of a typical 56 kbps communication path using current PCM modem technology. A central site, such as an internet service provider (ISP) 100, is digitally connected to a telephone network 130 through a transmitter 110 and a receiver 120 of an ISP modem 105. The network 130 is connected to a local loop 150 through a central office line card 140. The line card typically has a PCM codec implemented therein. The local loop 150 is connected to the user's personal computer (PC) 170 at the user's site through the user's modem 160. As can be appreciated by those skilled in the art, the connection between the ISP modem transmitter 110 to the telephone network 130 is a digital connection with a typical data rate of about 64 kbps. Since the parameters of the telephone network 130 and line card 140 are dictated and set by the operating specifications of the network (and particularly the use of the $\mu$-law or A-law signal point constellations), the central site transmitter 110 is configured to transmit the digital data in a particular way to fully exploit its digital connection to the network.

A proposed operating protocol for 56 kbps PCM modem systems calls for the use of a data transmission scheme that performs multiple modulus conversion (MMC) on a number of bits that may be provided by a suitable scrambler or other processing element. Betts et al., U.S. Pat. No. 5,475,711, issued Dec. 12, 1994 and Betts et al., U.S. Pat. No. 5,684,834, issued Nov. 4, 1997, disclose data transmission systems that utilize single modulus converters in different contexts. MMC, on the other hand, is a known technique for expressing an integer number as a sum of quotients containing multiple moduli (or bases). A technical contribution by Dale Walsh entitled *Multiple Modulus Conversion for Robbed Bit Signaling Channels* (TIA TR30 Meetings, Mar. 4, 1997) sets forth a general manner in which MMC may be used in the context of 56 kbps modem systems. The entire content of these publications is incorporated herein by reference.

In accordance with the MMC process, an integer (R) may be expressed as:

$$R = K_0 + K_1 M_0 + K_2 M_0 M_1 + \ldots + K_{L-1} M_0 M_1 \ldots M_{L-2},$$

where L is the number of symbols per frame, $M_i$ are the mapping moduli (the mapping moduli also represent the number of signal point magnitudes contained in the signal point constellation associated with the i-th data frame phase), and $0 \leq K_i < M_i$. In a 56 kbps modem application, the multiple moduli $M_i$ (which are determined prior to mapping) are used to map a number of bits expressed as an integer number R. In the 56 kbps modem context, MMC operates in the absence of sign bits; sign bits are removed prior to the MMC process and replaced afterward. The MMC process generates the values of $K_i$, which represent mapping indices associated with the respective signal point constellations. Thus, each $K_i$ value is used to select a particular PCM codeword for transmission over the telephone network. Upon decoding at the receiving modem, the original digital data is recovered (assuming no transmission errors).

Currently proposed mapping and encoding protocols for 56 kbps modems often may not produce the most efficient data communication session from a transmission power perspective. Transmission power limitations are mandated by regulatory bodies such as the Federal Communications Commission (FCC). For example, current FCC regulations on modem transmissions over the public telephone network require that average power levels do not exceed −12 dBm. Accordingly, the particular codewords associated with each transmission session, and the manner with which such codewords are transmitted, may be selected to ensure that the given power level is not exceeded. On the other hand, unnecessarily low power levels may cause a low system signal to noise ratio (SNR), which can result in an increased probability of errors and otherwise poor system performance.

One current 56 kbps modem system utilizes signal point constellations with codewords having descending magnitudes relative to the index values. In other words, using the above example, the magnitudes of the codewords associated with constellation $M_I$ decrease as the value of index $K_1$ increases. The $K_i$ values are derived by the MMC procedure in a manner such that, for any given constellation, the lower values for a given index $K_i$ may occur more frequently than higher values for that index. Consequently, for a modem system that uses a descending magnitude scheme, codewords requiring relatively higher transmit power are transmitted more often than codewords requiring relatively lower transmit power. The high transmission probability associated with the larger magnitude codewords results in a communication system having an inefficient allocation of allowable transmit power.

As mentioned above, regulatory bodies may place limits on the total average power utilized for a given data communication session. Accordingly, after the appropriate signal point constellations are selected, the total average transmit power may be calculated to ensure that it does not exceed the power limit. Unfortunately, the total average transmit power associated with a 56 kbps modem system may not be readily obtainable. Thus, the total average transmit power is often conservatively estimated for purposes of comparison to the power limit. However, such conservative estimates may result in the use of less than optimal constellations, lower system SNR, smaller minimum distances between constellation points, and a higher likelihood of errors.

In accordance with a proposed exemplary 56 kbps modem system, six symbols are transmitted in each data frame, six moduli ($M_0$–$M_5$) are employed in the MMC process, and six corresponding signal point constellations are utilized during mapping to produce one of a plurality of universal PCM codewords. These PCM codewords are eventually transmitted on a symbol by symbol basis. The symbol associated with the $M_0$-point constellation is transmitted first in time, the symbol associated with the $M_5$-point constellation is transmitted last in time, and the other symbols follow in a like temporal order. Although this arrangement is logical and easy to implement, it may not be suitable in situations where specific cost functions, such as transmit power, are to be considered. For example, following the proposed rigid transmit order may not adequately take advantage of, or compensate for, the presence of robbed bit signaling (RBS) within the telephone network.

Consequently, it would be desirable to implement improved techniques in conjunction with MMC processes to address the above shortcomings of proposed 56 kbps modem systems.

SUMMARY OF THE INVENTION

An advantage of the present invention is that it provides improved techniques for use in a modem system that employs a multiple modulus conversion (MMC) procedure.

Another advantage of the present invention is that signal point constellations are arranged to receive the output indices generated by the MMC procedure such that the probability of transmission of higher power codewords is relatively low compared to the probability of transmission of lower power codewords, while maintaining the same or larger minimum distance between signal points.

A further advantage of the present invention is that it provides a technique for obtaining the probability of occurrence for each constellation or signal point associated with a given data communication session.

Another advantage is that the present invention provides a method for determining the theoretical average transmit power associated with a given set of signal point constellations and MMC parameters.

A further advantage is that the present invention provides a method for estimating a reasonable upper bound for the average transmit power associated with a given set of signal point constellations and MMC parameters.

Another advantage of the present invention is that it enables the codewords defined by an MMC procedure to be transmitted in a specific order that may be optimized in accordance with a particular cost function associated with the modem system.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF PREFERRED EMBODIMENTS

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one exemplary application for the invention. Further, it should be noted that the present invention may employ any number of conventional techniques for data transmission, control signaling, signal processing and conditioning, and the like. Such general techniques are known to those skilled in the art and will not be described in detail herein.

Figure 1:
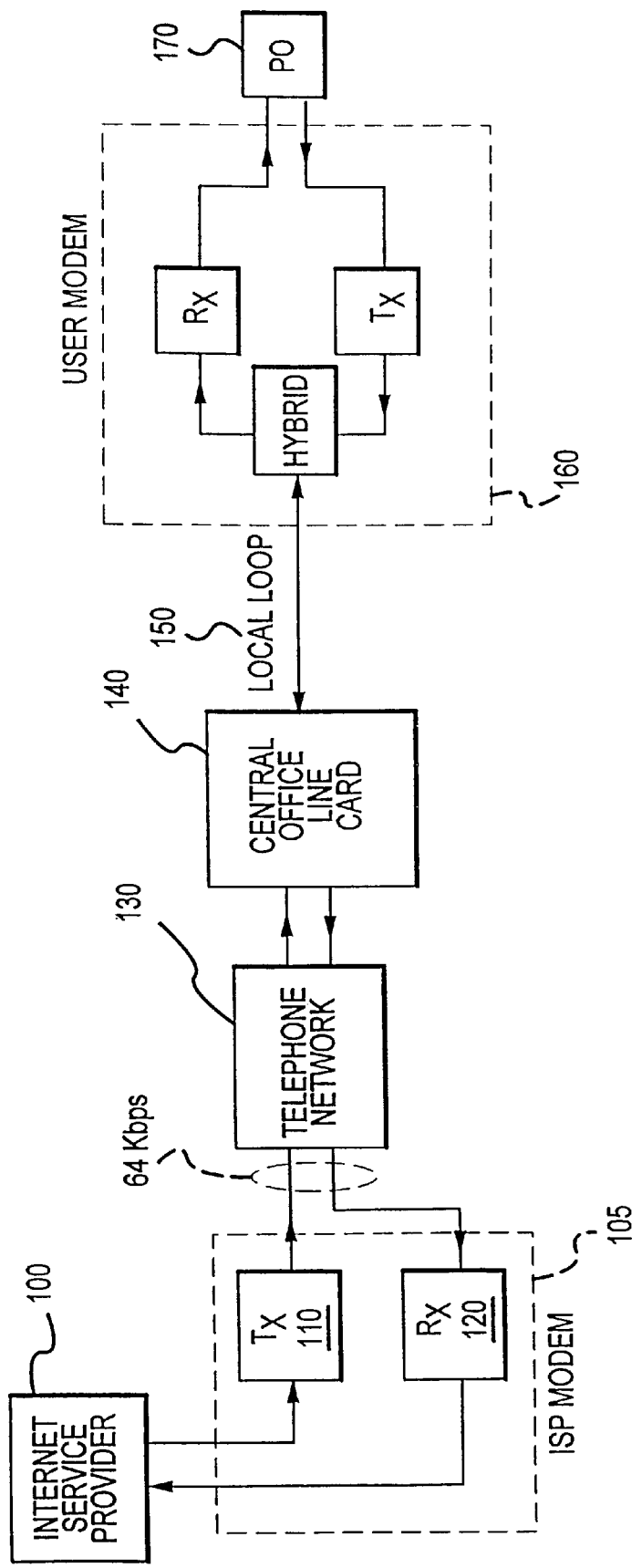
FIG. 1 is a conceptual block diagram of an exemplary data communication system using PCM techniques.
Figure 2:
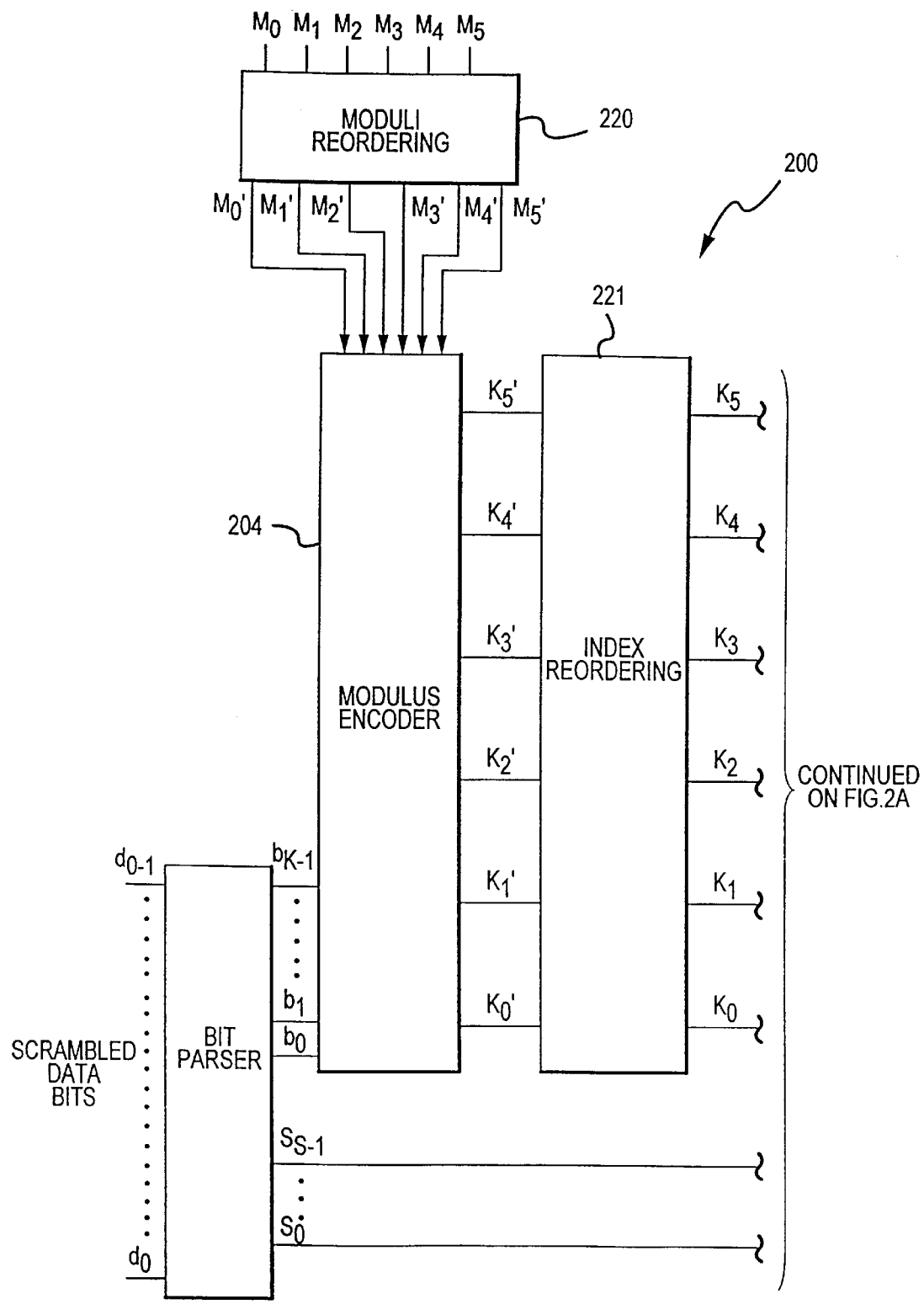
FIG. 2 is a conceptual block diagram of an exemplary encoder that may be used in the ISP modem shown in FIG. 1.
Figure 2A:
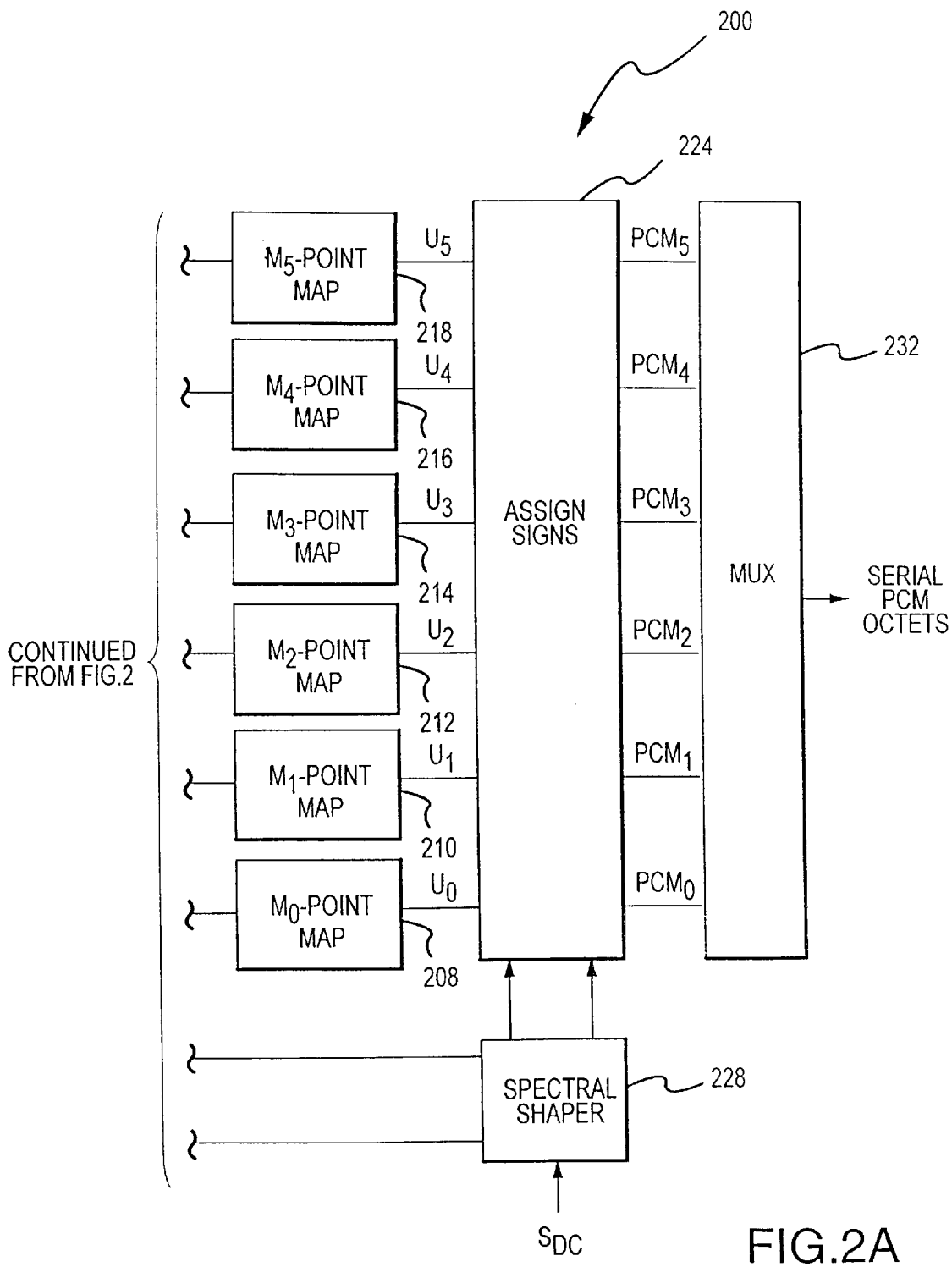

With reference to FIGS. 1–2, an exemplary 56 kbps PCM-based modem transmitter includes an encoder 200, which is generally configured to convert a number of input bits (identified as bits $b_0$–$b_{B-1}$) into PCM codewords. The PCM codewords (identified as $PCM_0$–$PCM_5$) are transmitted in a serial manner through telephone network 130 as 8-bit octets or symbols. In accordance with currently proposed operating protocols, each data frame is represented by six symbols, however, the present invention is not limited to any specific frame length, symbol size, or number of bits processed by encoder 200.

Encoder 200 preferably includes a modulus encoder 204 configured to perform an MMC procedure on the digital data input thereto. For purposes of this description, B is the number of bits that are input into modulus encoder 204 for a given data frame. As shown in FIG. 2, a number of bits ($S_0$–$S_{s-1}$) are removed from the input of scrambled data bits such that the MMC procedure is only performed on information bits used to map the signal point magnitudes. Following the MMC procedure, sign bits may be assigned to each symbol in a suitable manner. In accordance with the preferred embodiment of the present invention, several operating parameters may be predetermined by the modem system prior to operation in a normal data mode. For example, the number of bits input into modulus encoder 204 may depend upon a current data rate and the number of redundant sign bits used during data transmission. Both of these parameters may be adaptively established between ISP modem 105 and user modem 160 during an initialization period. In one proposed 56 kbps operating scheme, B (the number of incoming bits) may range between 15 and 39 bits; lower values of B correspond to lower data rates. Of course, the range of B may vary depending on the specific application and the present invention is not limited to any particular range of B.

In addition to the determination of B, the moduli values ($M_0$–$M_5$) may be determined, along with their corresponding signal point constellations, during an adaptive initialization period. A number of factors may govern the selection of the $M_i$ values and the particular signal points assigned to each of the corresponding constellations. For example, the exemplary MMC process described herein requires that $2^B \leq M_0 M_1 \ldots M_5$, which ensures that the integer represented by the B bits can be expressed in terms of the moduli. In addition, the signal points selected for each individual constellation may be limited to a subset of standard values, e.g., $\mu$-law values in the United States and A-law values in Europe. The specific selection of the individual signal points may be governed by any number of cost functions such as transmit power limits, minimum distance between signal points, the probability of occurrence of each signal point, the presence and/or form of digital impairments (e.g., RBS or digital pads), or the peak-to-mean ratio of the transmitted signal. After the modem system determines the values of B, $M_i$, and the signal points associated with each of the $M_i$-point constellations, encoder 200 may begin transmitting information in a normal data mode. It should be noted that each of the above parameters may remain unchanged for the duration of any particular communication session and that one or more of such parameters may be modified in response to, e.g., renegotiation procedures, loss of synchronization, or the like.

In accordance with one aspect of the present invention, encoder 200 includes a moduli reordering element 220, which may be configured to perform any number of optimized reordering functions with respect to the $M_i$ values. The outputs of moduli reordering element 220, $M_0'$–$M_5'$, may reflect any suitable reordering of $M_0$–$M_5$. The current inventors have recognized that the order associated with the various $M_i$ values need not be rigidly designated or restricted in any manner. Indeed, this flexibility enables moduli reordering element 220 to optimally designate certain signal point constellations for use with transmissions of specific a symbol locations within the given data frame. The particular reordering function followed by moduli reordering element 220 may be dictated by any number of cost functions associated with the modem system. For any given communication session, moduli reordering element 220 may be adaptively adjusted during an initialization or renegotiation period to facilitate an optimized MMC procedure relative to one or more operating parameters. It should be appreciated that moduli reordering element 220 may be realized by any number of suitable functional components, e.g., look-up tables, programmable memory elements, or digital processing components.

As described above, the present inventors have discovered that, for the same $M_0$–$M_5$ and associated signal points, reordering the moduli input into modulus encoder 204 may affect transmit power and other parameters of the modem system. As a result of the power reduction, an adaptive constellation design procedure may be able to generate constellations having larger minimum distances between signal points without exceeding the transmit power limits; the larger minimum distances are desirable to increase the transmission SNR. An exemplary application of this reordering may be applied to compensate for the presence of RBS. RBS occurs within a given network link, where the least significant bit of every sixth symbol is robbed and utilized for network signaling. In other words, the robbed bits are not available for use with the modem system. Thus, the use of smaller $M_i$ maps for the mapping of RBS phase symbols may be called for by an adaptive constellation procedure.

Through an empirical analysis, the inventors have discovered that power reduction can be achieved by mapping the RBS phases at the end of the MMC operation, regardless of which phase the RBS occurs. In other words, the moduli associated with the RBS phases in a conventional MMC arrangement are reordered such that they are applied at the later stages (for an example where only one RBS phase is present, the reordering causes the MMC procedure to map the RBS phase at the last MMC stage) of the MMC operation. The specific ordering described herein is merely exemplary and the actual reordering algorithm may be configured to optimize any parameter for the particular modem system.

For a given communication session, RBS may affect more than one symbol within a data frame because different network links may utilize RBS. For a particular end-to-end modem connection, RBS may occur in zero, one, two, or three symbols within a data frame. As explained above, the occurrence of RBS remains periodic regardless of the number of symbols tainted by RBS. Therefore, in accordance with the principles of the current invention, moduli reordering element 220 may be configured to suitably reorder more than one moduli to compensate for multiple RBS phases. For example, if RBS occurs at phases 1 and 3 of the mapping frame, then moduli reordering element 220 may perform the following function to ensure that the smallest constellations are utilized for encoding and decoding at the RBS phases:

$M_0 \rightarrow M_0'$ $M_1 \rightarrow M_2'$ $M_2 \rightarrow M_4'$ $M_3 \rightarrow M_5'$ $M_4 \rightarrow M_1'$ $M_5 \rightarrow M_3'$ Alternatively, reordering element 220 may assign $M_4$ to $M_3'$ and $M_5$ to $M_1'$. Indeed, the specific manner with which moduli reordering element 220 reorders $M_i$ to $M_i'$ may be governed by any suitable criteria. It should be appreciated that moduli reordering element 220 need not reorder each and every moduli (as demonstrated in the above example where $M_0$ remains at the initial symbol position), i.e., $M_0$ is "reordered" to the $M_0'$ position. The present invention may employ adaptive optimization routines to specifically dictate a reordering that satisfies one or more cost function considerations such as the presence of RBS and transmit power limits. User modem 160 may perform the appropriate analyses, determine a suitable reordering scheme, and transmit data indicative of the reordering scheme to ISP modem 105.

With continued reference to FIG. 2, the MMC procedure will be explained in more detail. Encoder 200 receives the B bits to be sent during a data frame of, e.g., six symbols. The MMC procedure allows the B bits to be mapped to six indices, equivalent to B/6 bits per symbol (not necessarily an integer number of bits per symbol). The B bits input to modulus encoder 204 are processed such that they are represented by an integer R:

$$R = b_0 + b_1 2 + b_2 2^2 + \ldots + b_{B-1} 2^{B-1},$$

where $b_0$ is the first bit in time and $b_{B-1}$ is the last bit in time of the B bits submitted to modulus encoder 204. Each of the $b_i$ values are either zero or one in this expression. It should be appreciated that in practice, R may be suitably expressed in terms of a hexadecimal number for processing by a microprocessor resident at encoder 200.

The number R is further processed such that it is represented in terms of the reordered moduli ($M_0'$–$M_5'$):

$$R = K_0' + K_1' M_0' + K_2' M_0' M_1' + \ldots + K_5' M_0' M_1' M_2' M_3' M_4'.$$

The output of modulus encoder 204 are the six index values designated by $K_0'$–$K_5'$, and $0 \leq K_i' < M_i'$. Modulus encoder 204 performs the following operations to determine these values:

$R_0 = R;$ $K_0' = R0 \text{ modulo } M_0'; R1 = (R0 - K_0')/M_0';$ $K_1' = R1 \text{ modulo } M_1'; R2 = (R1 - K_1')/M_1';$ $K_2' = R2 \text{ modulo } M_2'; R3 = (R2 - K_2')/M_2';$ $K_3' = R3 \text{ modulo } M_3'; R4 = (R3 - K_3')/M_3';$ $K_4'=R4$ modulo $M_4'$; $R5=(R4-K_4')/M_4'$;

$K_5'=R5$.

It should be appreciated that modulus encoder 204 may perform a conventional MMC procedure using the B bits and $M_0'$–$M_5'$ as respective inputs. As shown in FIG. 2, the $K_i'$ values are utilized for inputs to an index reordering element 221. Index reordering element 221 is operationally associated with moduli reordering element 220 such that the appropriate indices are utilized with the corresponding signal point maps.

In the preferred embodiment, index reordering element 221 functions to reorder the $K_i'$ indices in a manner corresponding to the function performed by moduli reordering element 220. For example, if moduli reordering element 220 performs the following reordering function:

$M_0 \rightarrow M_0'$ $M_1 \rightarrow M_1'$ $M_2 \rightarrow M_2'$ $M_3 \rightarrow M_5'$ $M_4 \rightarrow M_3'$ $M_5 \rightarrow M_4'$, then index reordering element 221 preferably performs the following reordering function:

$K_0' \rightarrow K_0$ $K_1' \rightarrow K_1$ $K_2' \rightarrow K_2$ $K_3' \rightarrow K_4$ $K_4' \rightarrow K_5$ $K_5' \rightarrow K_3$.

Index reordering element 221 may also be employed where multiple moduli are reordered, e.g., for the above example where RBS occurs at symbol phases 1 and 3, index reordering element 221 may reorder the indices according to the following scheme:

$K_0' \rightarrow K_0$ $K_1' \rightarrow K_4$ $K_2' \rightarrow K_1$ $K_3' \rightarrow K_5$ $K_4' \rightarrow K_2$ $K_5' \rightarrow K_3$.

The reordered $K_i$ values are used for inputs to the respective signal point maps 208, 210, 212, 214, 216, and 218. A $K_i$ value serves as an index for the selection of a particular codeword from the corresponding $M_i$ map. In the preferred embodiment, the respective outputs from signal point maps 208, 210, 212, 214, 216, and 218 are universal PCM codewords that are related to the $\mu$-law (or A-law) signal point constellations employed by telephone network 130. The specific values assigned to these universal codewords may be found in the proposed V.PCM Standard, published Dec. 12, 1997 by the ITU Telecommunications Standardization Sector. The entire content of this publication is incorporated herein by reference. It should be appreciated that the principles of the present invention may apply in systems that employ direct mapping to $\mu$-law or A-law codeword values, i.e., systems that do not utilize universal codewords. In accordance with one known transmission scheme, these universal PCM codewords (identified by $U_i$ in FIG. 2) are transmitted in a temporal order corresponding to their subscript designations. In other words, the known scheme causes $U_0$, which is represented by the $PCM_0$ octet, to be transmitted first in time and $U_5$, which is represented by the $PCM_5$ octet, to be transmitted last in time.

The universal codewords $U_i$ may be routed to a polarity block 224, which preferably functions to assign a positive or negative sign bit to the universal codewords. The particular sign assigned to the individual universal codewords may be dictated by a spectral shaper 228 that communicates with polarity block 224. Spectral shaper 228 may use redundant sign bits to control the spectral content of the transmit signal in accordance with any number of application-specific parameters, e.g., to facilitate DC suppression.

Polarity block 224 produces a PCM codeword associated with each universal codeword. In the context of this description, $PCM_0$ refers to the first-transmitted symbol or octet in the data frame and $PCM_5$ refers to the last-transmitted symbol or octet in the data frame. Further, $PCM_i$ corresponds to $U_i$ for all values of i. The PCM octets may be input to a multiplexer 232, which is suitably controlled to produce a serial stream of the PCM octets in the designated temporal order.

The PCM octets are transmitted through telephone network 130, converted into analog signals at, e.g., line card 140, and received by user modem 160 (see FIG. 1). User modem 160 may employ suitable analog or digital filtering, conditioning, decoding, and processing techniques to obtain the original data (indicated by $b_0$–$b_{B-1}$ in FIG. 2). Although not shown, user modem 160 preferably includes a moduli reorder element and an index reorder element that perform the reverse operation of moduli reordering element 220 and index reordering element 221, respectively. As described above, the particular reordering operations are preferably predetermined by the modem system during the initialization procedure and stored at ISP modem 105 and user modem 160.

In accordance with another aspect of the present invention, the signal points within any given constellation (e.g., maps 208, 210, 212, 214, 216, and 218) are suitably arranged to address certain transmit power considerations. A currently proposed 56 kbps protocol orders the universal codewords in descending order relative to the corresponding index value. One exemplary prior art constellation arrangement is set forth in Table 1 below.

TABLE 1

Exemplary Signal Point Constellation Ordering

| K | U (Prior Art) | U (Current) |
|---|---|---|
| 0 | 114 | 8 |
| 1 | 102 | 14 |
| 2 | 89 | 33 |
| 3 | 73 | 40 |
| 4 | 64 | 58 |
| 5 | 58 | 64 |
| 6 | 40 | 73 |
| 7 | 33 | 89 |
| 8 | 14 | 102 |
| 9 | 8 | 114 |

According to standard operating protocols, lower universal codeword values correspond to PCM codewords having lower signal magnitudes and higher universal codeword values correspond to PCM codewords having higher signal magnitudes. As shown in Table 1, in the prior art arrangement, the lowest value of K identifies the universal codeword corresponding to the largest signal point magnitude. As described above in connection with the MMC procedure, the lower index values for any given constellation may have a higher likelihood of occurrence than the higher index values. This occurs because $2^B < M_0 M_1$ . . .

$M_{L-1}$, and because some of the larger index values may not be selected as often in response to the B-bit input to modulus encoder 204. Consequently, in the proposed scheme, relatively higher magnitude PCM codewords are more likely to be transmitted than relatively lower magnitude PCM codewords. Unfortunately, this scheme results in an inefficient use of available transmit power.

One preferred embodiment of the present invention suitably reorders the universal codewords in an ascending order (see Table 1). This index ordering assures that the lower K values, which may occur more frequently during the communication session, are associated with PCM codewords having relatively lower magnitudes. Thus, transmit power is conserved and, preferably, optimized by the particular constellation ordering scheme. The present invention may suitably arrange the order of the universal codewords in response to an adaptive analysis performed during an initialization period. Such an adaptive analysis may contemplate any number of cost functions in addition to transmit power. Those skilled in the art will be familiar with various operating characteristics and functional limitations that may require optimization and which may be affected by the particular constellation ordering.

As mentioned above, transmit power considerations can play an important role during adaptive signal point constellation design and various optimization techniques. Current FCC regulations limit the total average transmit power over a telephone network channel to −12 dBm. Accordingly, modem systems must be designed to operate in a robust and reliable manner while maintaining the total average transmit power within the FCC limit. For this reason, prior art modem systems may estimate the total average power associated with a given signal point constellation and compare the estimated value with the −12 dBm limit. If the estimated power exceeds the FCC limit, then the modem system may redesign the constellation such that its total average power is within an acceptable range.

The present invention provides a technique for determining the exact total average power (or a reasonably accurate estimate) associated with the signal point maps used by the exemplary 56 kbps modem system described herein. If the number of bits in each symbol is an integer, then $2^B = M_0 M_1 \ldots M_{L-1}$ and the probability of occurrence is equal for each signal point within the associated constellation. Accordingly, the exact total power for such a uniform probability of occurrence is simply equal to:

$$Power = \frac{1}{L}\sum_{i=0}^{L-1} \frac{1}{M_i} \sum_{j=0}^{M_i-1} S_{i,j}^2,$$

where S is the magnitude of the particular signal point and L is the number of symbols per data frame.

However, the present invention also contemplates the transmission of symbols having an effective non-integer bit count. In such transmissions, $2^B < M_0 M_1 \ldots M_{L-1}$. The transmission of fractional bits per symbol makes an exact power determination more difficult, especially where MMC techniques are employed. This difficulty is due to the unequal probability of occurrence associated with the signal points within the signal point constellations. The present invention provides a methodology for determining the exact average transmit power for the modem system described herein. Generally, the power calculation initially determines the probability of transmission of each individual signal point within a particular constellation. Then, the probabilities of occurrence are used to generate the average total power for each of the constellations (six in the exemplary embodiment described herein). Finally, the power for all of the constellations is determined and averaged to produce the total average power for the given data communication session. The counting scheme described herein is useful for explanatory purposes and to conveniently set forth the principles of the present invention. It should be appreciated that variations of the total average power derivation are also contemplated by the present invention.

As described above, modulus encoder 204 receives an input of B bits (B may vary depending on the current data rate). The B bits can be represented as an integer R expressed in terms of a modulus (base) of two:

$$R = b_0 + b_1 2 + b_2 2^2 + \ldots + b_{B-1} 2^{B-1},$$

where $b_i$ equals zero or one. Modulus encoder 204 suitably converts the B bits into an integer expressed in terms of the multiple moduli $M_i$:

$$R = K_0 + K_1 M_0 + K_2 M_0 M_1 + \ldots + K_{L-1} M_0 M_1 \ldots M_{L-2},$$

where L is the number of symbols per data frame, e.g., six in the preferred embodiment. If all of the B input bits are zeros, then R=0; if all of the B input bits are ones, then $R=2^{B-1}$. It follows that all of the other B-bit patterns correspond to an integer R, where $0<R<2^B-1$. It also follows that there are $2^B$ possible integer values for R that may be used for the mapping of the B bits.

In the current 56 kbps paradigm that employs an input bit scrambler, it can be reasonably assumed that all possible B-bit patterns (and, correspondingly, all possible integer R values) occur with equal probability during any given transmission session. Accordingly, the theoretical total transmission power can be determined by summing the power of the six PCM levels mapped by modulus encoder 204 from each possible B-bit pattern, then dividing the sum by $2^B$. In the preferred six symbol/frame embodiment described herein, the total average transmission power may be obtained by first summing, for all integer values of R, the energy of the six symbols indexed by modulus encoder 204. The total transmission power is then obtained by dividing this sum by $2^B*6$, because there are a total of $2^B$ terms and each term includes six symbols.

The procedure described immediately above may be too computationally rigorous to implement in an efficient and practical manner. However, the present inventors have recognized that the MMC procedure lends itself to an elegant "shortcut" technique for determining the exact transmission power associated with given MMC mapping parameters. This simplified approach takes advantage of the observation that the MMC procedure represents the integer R as a "number" between 000000 to $A_0A_1A_2A_3A_4A_5$, using $M_0-M_5$ as the mixed counting bases, where $A_0A_1A_2A_3A_4A_5$ is the output of modulus encoder 204 corresponding to an input pattern of all B bits equal to one. In other words, the counting scheme may be expressed as shown in Table 2 below.

TABLE 2

Exemplary MMC Counting Scheme

| R | $K_0$ | $K_1$ | $K_2$ | $K_3$ | $K_4$ | $K_5$ |
|---|---|---|---|---|---|---|
| 0 | 0 | 0 | 0 | 0 | 0 | 0 |
| 1 | 1 | 0 | 0 | 0 | 0 | 0 |

TABLE 2-continued

Exemplary MMC Counting Scheme

| R | $K_0$ | $K_1$ | $K_2$ | $K_3$ | $K_4$ | $K_5$ |
|---|---|---|---|---|---|---|
| 2 | 2 | 0 | 0 | 0 | 0 | 0 |
| ... | ... | ... | ... | ... | ... | ... |
| $M_0 - 1$ | $M_0 - 1$ | 0 | 0 | 0 | 0 | 0 |
| $M_0$ | 0 | 1 | 0 | 0 | 0 | 0 |
| $M_0 + 1$ | 1 | 1 | 0 | 0 | 0 | 0 |
| ... | ... | ... | ... | ... | ... | ... |
| $2M_0$ | 0 | 2 | 0 | 0 | 0 | 0 |
| $2M_0 + 1$ | 1 | 2 | 0 | 0 | 0 | 0 |
| ... | ... | ... | ... | ... | ... | ... |
| $M_0 M_1 - 1$ | $M_0 - 1$ | $M_1 - 1$ | 0 | 0 | 0 | 0 |
| $M_0 M_1$ | 0 | 0 | 1 | 0 | 0 | 0 |
| ... | ... | ... | ... | ... | ... | ... |
| $M_0 M_1 M_2 - 1$ | $M_0 - 1$ | $M_1 - 1$ | $M_2 - 1$ | 0 | 0 | 0 |
| $M_0 M_1 M_2$ | 0 | 0 | 0 | 1 | 0 | 0 |
| ... | ... | ... | ... | ... | ... | ... |
| $M_0 M_1 M_2 M_3 - 1$ | $M_0 - 1$ | $M_1 - 1$ | $M_2 - 1$ | $M_3 - 1$ | 0 | 0 |
| $M_0 M_1 M_2 M3$ | 0 | 0 | 0 | 0 | 1 | 0 |
| ... | ... | ... | ... | ... | ... | ... |
| $M_0 M_1 M_2 M_3 M_4 - 1$ | $M_0 - 1$ | $M_1 - 1$ | $M_2 - 1$ | $M_3 - 1$ | $M_4 - 1$ | 0 |
| $M_0 M_1 M_2 M_3 M_4$ | 0 | 0 | 0 | 0 | 0 | 1 |
| ... | ... | ... | ... | ... | ... | ... |
| $2^B - 1$ | $A_0$ | $A_1$ | $A_2$ | $A_3$ | $A_4$ | $A_5$ |

In Table 2, each column (representing the values of the $K_i$ indices) includes $2^B$ entries or index values. For the i-th column, the index number begins with 0, counts up to $M_i-1$, returns to 0, and continues counting in this manner until it reaches the final count of $A_i$. For the base associated with $A_0$, the index value $K_0$ changes once for every increment of R. For the base associated with $A_1$, the index value $K_1$ changes once for every $M_0$ increments of R (in the example shown in Table 2, $M_1 \geq 3$ because a value of $K_1=2$ is indicated. Similarly, for the base associated with $A_2$, the index value $K_2$ changes once for every $M_0 M_i$ increments of R. The counting scheme follows this general trend for all of the bases and moduli.

The frequency of occurrence for each number in a particular column corresponds to the probability of occurrence of the particular signal point identified by that index number. Further, the total number of occurrences (identified by columns in Table 2) for any $K_i$ is equal to $2^B$. Accordingly, for any given input pattern B, the probability of occurrence for the various indices can be uniquely defined by the values of $M_i$ and $2^B$ or uniquely defined by the MMC output of the integer $2^B-1$, i.e., a B-bit pattern of all ones. The respective values of $A_i$ may be equal to any integer from 0 to $M_i-1$. Accordingly, depending upon the specific value of $A_i$, higher values of $K_i$ may not occur as often as relatively lower values of $K_i$. This characteristic is illustrated in Table 2, which shows values of $A_i$ occurring in the final "count cycle" from 0 to $M_i-1$. The value of $A_i$ relative to $M_i-1$ affects the probability of occurrence associated with the different $K_i$ index values (described in more detail below).

Considering the above observations and characteristics of the MMC counting scheme, the present invention defines and determines several parameters to facilitate the determination of the exact transmit power for a given constellation set. Initially, the parameter $P_k$ may be defined as:

$$P_k = \prod_{i=0}^{k} M_i, \forall\, 0 \leq k \leq L-1;\, P_k = 1, \forall\, k < 0.$$

It should be apparent that $P_k$ represents a "full counting cycle" within the k-th position or column. For purposes of this description, a "full counting cycle" means one counting iteration from 0 back to 0 for the i-th modulus. For example, for k=0, the index value of $K_0$ repeats after $M_0$ counts (the count may be 0, 1, 2, ... $M_0$1, 0, 1, 2, ... $M_0$-1, 0 ... ). For k=1, the index value of $K_1$ repeats only after $M_0 M_1$ counts.

A parameter $q_k$ may be defined as $q_k = \text{INT}(2^B/P_k)$, where the operator INT(X) retains the quotient of $2^B/P_k$. The parameter $q_k$ provides the number of "full" counting cycles associated with the k-th position as the MMC output counts up from all zeros to the highest value defined by the $A_k$ values. The INT operation ensures that only full counting cycles are accounted for.

A parameter $r_k$ may be defined as $r_k = \text{INT}\{(2^B - P_k q_k)/P_{k-1}\}$. This parameter provides an indication, for the k-th position, of the number of "sub-cycles" contained in the residual number of index values remaining after considering the "full" counting cycles defined by $q_k$. In the context of this description, a "sub-cycle" for the k-th position equals $P_{k-1}$. For example, for $K_1$, a full cycle equals $M_0 M_1$ counts and a sub-cycle equals $M_0$ counts. It should be appreciated that the values of $r_k$ will be dependent upon the respective values of $A_k$.

An additional parameter, defined as $C_k = (2^B - P_k q_k)$ MODULO $P_{k-1}$, provides an indication of where $A_k$ is located relative to the $P_k$ counting cycle and relative to the $P_{k-1}$ counting cycle. For example, the ending count associated with a particular $A_k$ value may correspond to an integer number of full counting cycles, i.e., $P_k$ cycles, or an integer number of full sub-cycles, i.e., $P_{k-1}$ cycles, or a residual index count associated with a sub-cycle. The MODULO operation provides this residual amount, which may be considered to be the remainder associated with $r_k$.

For each $K_i$, $2^B$ may be represented by the number of associated full cycles, the number of associated sub-cycles, and any residual count remaining after all subcycles have been accounted for. Accordingly, the above parameters are related by the expression $2^B = P_k q_k + P_{k-1} r_k + c_k$. In addition, the above expressions imply that $r_k P_{k-1} < P_k$ and $c_k < P_{k-1}$.

Figure 3:
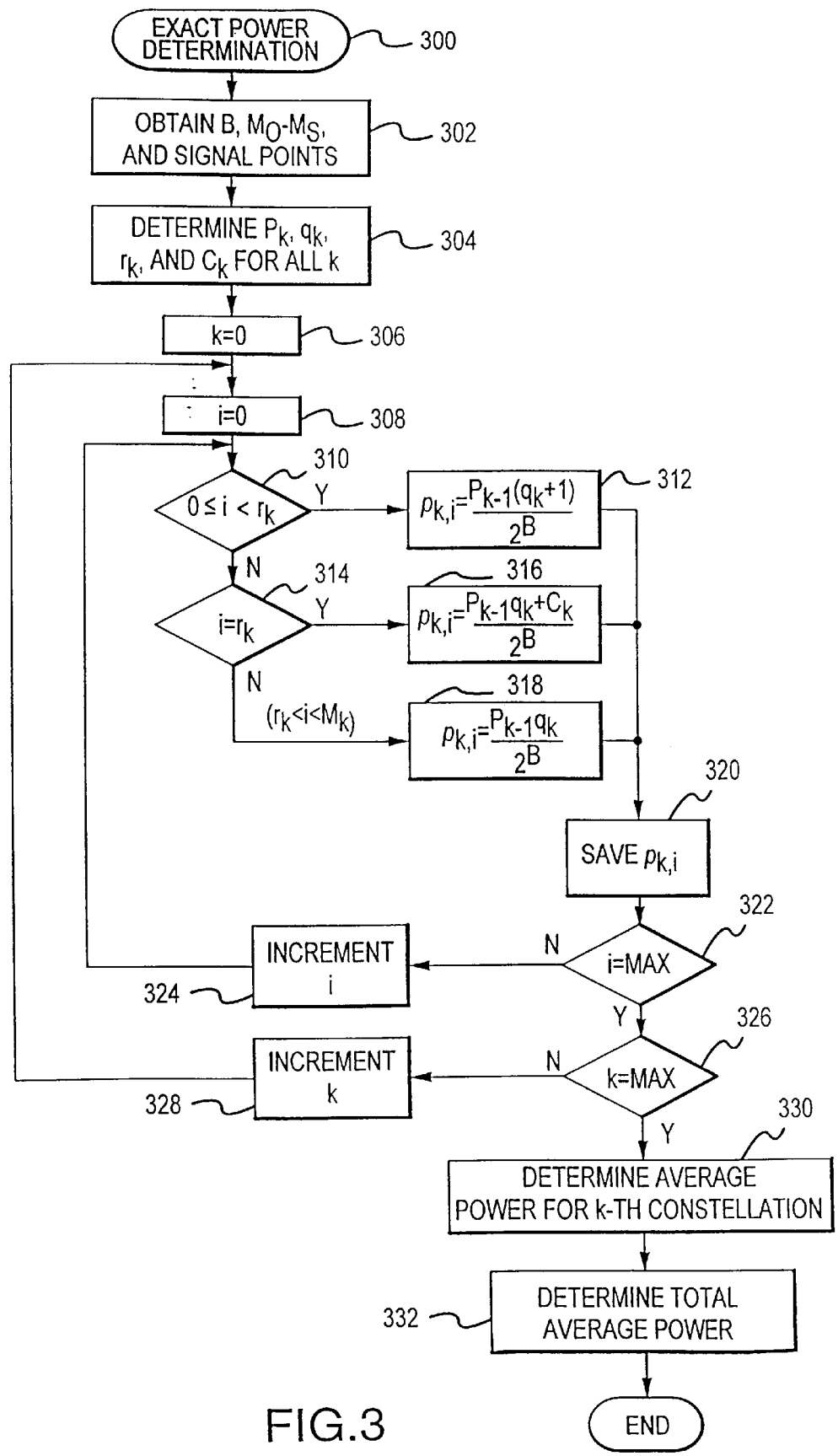
FIG. 3 is a flow diagram of an exact power determination process that may be performed by the data communication system.

FIG. 3 depicts an exact power determination process 300 that may be performed by the modem system during an initialization procedure. Process 300 may be repeated for any number of signal point constellation sets and process 300 may be an integral part of an overall adaptive constellation design procedure. It should be appreciated that the modem system may implement process 300 in accordance with any number of conventional techniques and that process 300 may be carried out by any number of microprocessor elements, memory elements, and the like, located at ISP modem 105 and/or user modem 160.

Process 300 may begin with a task 302, which obtains the current values for B (number of bits encoded for each frame) and all $M_i$, and the magnitudes of the signal points contained in each of the $M_i$ constellations. As described above, these quantities and parameters are preferably determined during an adaptive constellation design procedure. Following task 302, a task 304 is preferably performed to determine a number of parameters and variables used by process 300 in its computation of the exact total average transmit power. In particular, task 304 determines $P_k$, $q_k$, $r_k$, and $c_k$ for all values of k.

After determining these intermediate parameters, process 300 continues to a task 306, which may suitably initialize a counter to set k=0. A task 308 similarly initializes a counter to set i=0. In the context of process 300, k indicates the k-th module or constellation and i indicates a specific index value associated with the k-th constellation. Accordingly, the maximum value of i is equal to the number of signal points contained in the associated constellation. Following task 308, a query task 310 may be performed to test whether $0 \leq i < r_k$. If so, then the probability of transmission associated with that signal point is calculated as $p_{k,i} = P_{k-1}(q_k+1)/2^B$ (task 312). If not, then query task 310 leads to a query task 314. Query task 314 determines whether $i=r_k$. If so, then the probability of transmission is calculated as $p_{k,i}=(P_{k-1}q_k+c_k)/2^B$ (task 316). If not, then it follows that $r_k < i < M_k$. Accordingly, the probability of transmission is calculated as $p_{k,i}=P_{k-1}q_k/2^B$ (task 318). It should be noted that more than one of these three expressions may be simultaneously valid for certain values of i and $r_k$. Furthermore, if any two of the three probability values are determined, then the remaining probability can be easily determined by utilizing the principle that the sum of the individual probability values for each of the $2^B$ occurrences must equal one. In the foregoing example, the probability value in task 312 applies for $r_k$ of the $2^B$ occurrences, the probability value in task 316 applies for one of the $2^B$ occurrences, and the probability value in task 318 applies for $(M_k - r_k - 1)$ of the $2^B$ occurrences.

After the appropriate probability value has been determined by task 312, 316, or 318, a task 320 may be performed to suitably save the value. Next, a query task 322 may be performed to check whether the current value of i is the maximum for the given constellation. If not, then a task 324 may increment i and cause process 300 to repeat the probability calculation for the incremented value of i. If, however, query task 322 determines that the maximum value of i has been reached, then a query task 326 may be performed to test whether the current value of k is the maximum for the given set of constellations. If not, then a task 328 may increment k and cause process 300 to repeat the probability calculations for all of the signal points associated with the next constellation. If the maximum value of k has been reached, then query task 326 may lead to a task 330. At this time, process 300 has collected and stored the probabilistic data associated with the transmission occurrence of the various signal points contained in each of the designated constellations.

Task 330 suitably determines the average power for the k-th module (for all k). In the preferred embodiment, task 330 performs the following operation:

$$E_k = \sum_{i=0}^{M_k-1} p_{k,i} S_{k,i}^2,$$

where $E_k$ is the average power for the k-th module, i.e., constellation, and $S_{k,i}$ is the magnitude of the i-th signal point in the k-th module. Thus, following task 330, the average power for each of the constellations is known. A task 332 is then performed to suitably determine the total average power associated with the set of constellations selected for the given communication session. Task 332 performs the following operation:

$$Power = \frac{1}{L} \sum_{k=0}^{L-1} E_k,$$

where L is the number of symbols per data frame, e.g., six in the example presented herein.

Those skilled in the art will appreciate that the present invention may be implemented by any number of alternative processing schemes. For example, equivalent probability expressions can be derived based on an initial value of $R = 2^B - 1$, i.e., an input pattern of all ones. The parameters described above are then defined in an analogous manner: $q_k = \text{INT}[(2^B-1)/P_k]$; and $c_k = [(2^B-1) - P_k q_k] \text{ MODULO } P_{k-1}$. Under these definitions of $q_k$ and $c_k$, the probability expression $p_{k,i}$ equals:

$$P_{k-1}(q_k + 1)/2^B \qquad \text{when } 0 \leq i < r_k;$$

$$(P_{k-1}q_k + c_k + 1)/2^B \qquad \text{when } i = r_k; \text{ and}$$

$$P_{k-1}q_k/2^B \qquad \text{when } r_k < i < M_k.$$

three probability values may be contemplated by such a generalized power expression yet be "invisible" from a computational perspective.

As another example, the different probability expressions may be included in a generalized power determination that may be derived without directly obtaining the individual probability values.

As shown above, the exact power determination can be a rigorous and complex procedure. Accordingly, it may be desirable to implement alternative techniques that provide an effective estimate of the total average power in a computationally efficient manner. For example, in applications using the ascending signal point numbering scheme described above in connection with Table 1, the lower magnitude signal points may occur more often than the higher magnitude signal points. Therefore, a total average power estimate using a uniform probability for all signal points serves as an upper bound. For example, one preferred embodiment may be configured to perform the following power estimate rather than the foregoing exact power calculation:

$$Power = \frac{1}{L} \sum_{i=0}^{L-1} \frac{1}{M_i} \sum_{j=0}^{M_i-1} S_{i,j}^2.$$

Figure 4:
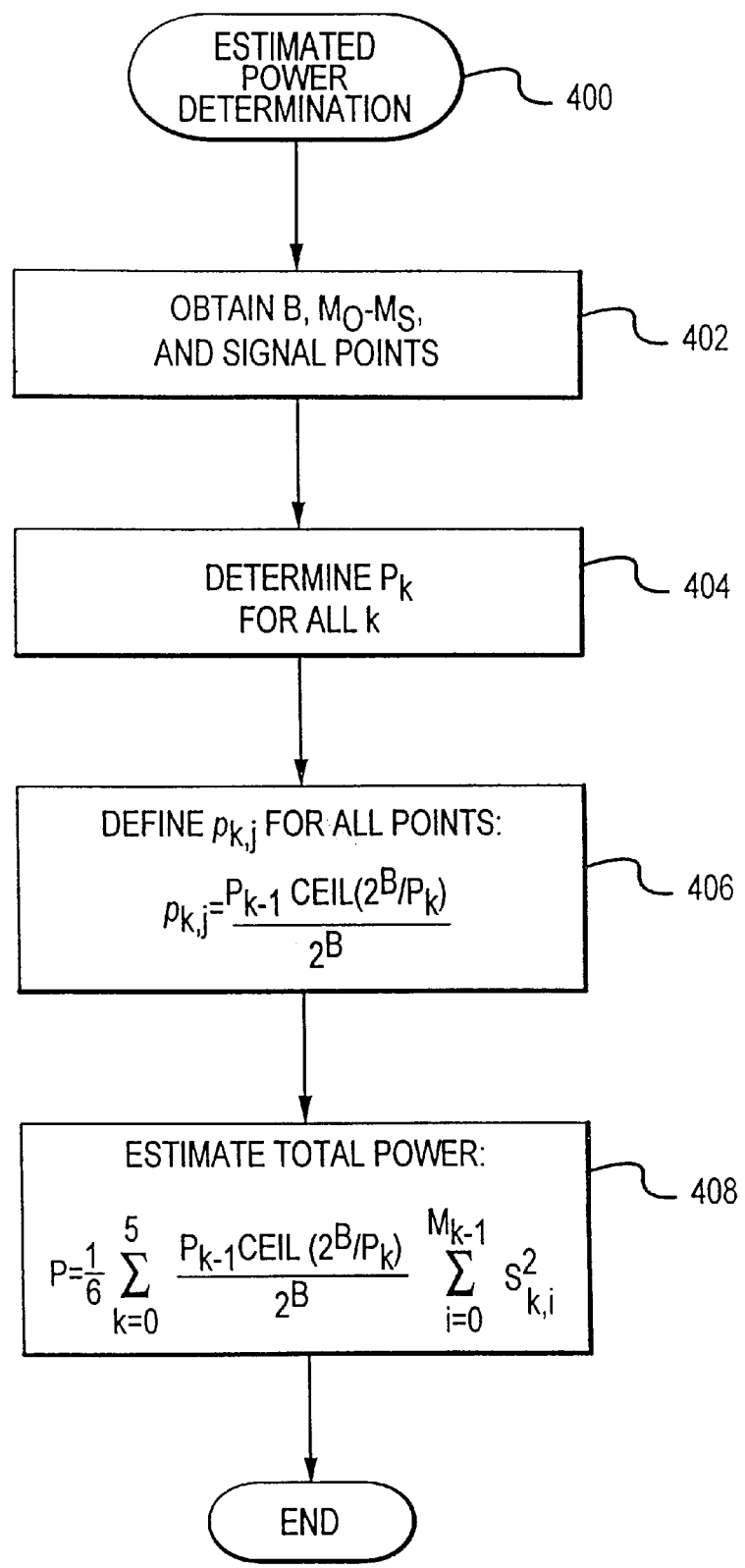
FIG. 4 is a flow diagram of an estimated power determination process that may be performed by the data communication system.

In applications using any other signal point numbering order, a calculation based on an assumption of uniform probability may not result in a valid upper bound. For example, in applications using the descending signal point numbering scheme described above in connection with the prior art system, an assumption of uniform probability may result in a total power estimate that is lower than the actual total power. This may occur because the actual probability of transmission of the higher magnitude signal points may be higher than any uniform probability estimate. As depicted in FIG. 4, the present invention may also be configured to perform an estimated power determination process 400 to accommodate such descending signal point numbering arrangements.

Process 400 begins with a task 402, which obtains the parameters B, $M_0-M_5$, and the signal point magnitudes associated with the constellations. Task 402 is similar to task 302 described above in connection with FIG. 3. A task 404 may be performed to determine the value of $P_k$ for all k values. Task 404 is similar to task 304, and the expression for $P_k$ is set forth above in connection with the description of task 304. A task 406 is preferably performed to calculate the probabilities of transmission associated with the given signal points. In accordance with this aspect of the present invention, the upper bound may be determined by assuming that the probability of transmission for all signal points will be the highest of the three probability expressions set forth in tasks 312, 316, and 318 and described in detail above.

Since $c_k < P_{k-1}$, the probability expression when $i = r_k$ is less than the probability expression when $0 \leq i < r_k$. Furthermore, because P>0, the probability expression when $r_k<i<M_k$ is also less than the probability expression when $0\leq i<r_k$. Consequently, process 400 utilizes the probability expression set forth in task 312 to generate the probabilities for all signal points. Again, this expression is: $p_{k,i}=P_{k-1}(q_k+1)/2^B$.

A task 408 is then performed to estimate the total average transmit power using the above probability expression for all values of i. Task 408 performs the following calculation:

$$Power = \frac{1}{L}\sum_{k=0}^{L-1}\frac{P_{k-1}ceil(2^B/P_k)}{2^B}\sum_{i=0}^{M_k-1}S_{k,i}^2.$$

As mentioned above, the preferred embodiment transmits six symbols per data frame, i.e., L=6. It should also be noted that this estimated upper bound can serve as a suitable upper bound for the total transmit power regardless of the signal point ordering associated with the signal point constellations. The above upper bound should be a tighter upper bound than $$Power = \frac{1}{L}\sum_{k=0}^{L-1}\frac{1}{M_k}\sum_{i=0}^{M_k-1}S_{k,i}^2\frac{\prod_{k=0}^{L-1}M_k}{2^B},$$

due to the following relationship:

$$P_{k-1}ceil(2^B/P_k) \leq \frac{\prod_{i=0}^{L-1}M_i}{M_k} = P_{k-1}\frac{\prod_{i=0}^{L-1}M_i}{P_k}.$$

In summary, the present invention provides improved techniques for use in a modem system that employs a multiple modulus conversion (MMC) procedure. In accordance with the present invention, the signal point constellations are arranged to receive the output indices generated by the MMC procedure such that the probability of transmission of higher power codewords is relatively low compared to the probability of transmission of lower power codewords, while maintaining the same or larger minimum distance between signal points. The present invention provides techniques for obtaining the probability of occurrence for each constellation or signal point associated with a given data communication session and for determining the theoretical average transmit power associated with a given set of signal point constellations and MMC parameters. In addition, the present invention provides a method for estimating a reasonable upper bound for the average transmit power associated with a given set of signal point constellations and MMC parameters. The present invention is also capable of transmitting the codewords defined by an MMC procedure in a specific order that may be optimized in accordance with a particular cost function associated with the modem system.

The present invention has been described above with reference to a preferred exemplary embodiments. However, those skilled in the art will recognize that changes and modifications may be made to these preferred embodiments without departing from the scope of the present invention. For example, the various processes described herein may be performed in an equivalent manner with more or less process tasks. For instance, process 300 need not calculate a probability value for each increment of i; it may simply calculate the three values and apply the appropriate value depending upon which condition the current value of i satisfies. Such changes and modifications are intended to be included within the scope of the present invention, as expressed in the following claims.

What is claimed is:

1. A method for signal point mapping in the context of a pulse code modulation (PCM) modem system, said method comprising the steps of:

deriving a plurality of signal point maps, each having a plurality of signal points associated therewith;

arranging signal points associated with at least one of said signal point maps in an ascending order such that signal points having relatively lower magnitudes are identified by relatively lower indices and signal points having relatively higher magnitudes are identified by relatively higher indices;

obtaining a number of bits to be processed by a multiple modulus encoder;

converting said number of bits in accordance with a multiple modulus conversion scheme to generate a plurality of index values associated with said signal point maps;

applying said index values to said signal point maps to identify specific signal points within said signal point maps; and estimating a total average power associated with data transmission using said signal point maps, said estimating step utilizing a uniform probability of occurrence for all signal points associated with said signal point maps.

2. A method for signal point mapping design in the context of a pulse code modulation (PCM) modem system that employs a multiple modulus conversion (MMC) procedure associated with a plurality of moduli to perform signal point mapping using a number of signal point maps, said method comprising the steps of:

deriving a plurality of signal point maps each having a plurality of signal points associated therewith;

obtaining a bit count associated with a number of bits to be processed by a multiple modulus encoder;

generating a plurality of output values with said MMC procedure in response to a predetermined binary input; and determining a total average power associated with data transmission using said signal point maps and utilizing said plurality of output values;

wherein said determining step calculates the probabilities of occurrence for each signal point contained in said signal point maps utilizing said plurality of output values.

3. A method for signal point mapping design in the context of a pulse code modulation (PCM) modem system that employs a multiple modulus conversion (MMC) procedure associated with a plurality of moduli to perform signal point mapping using a number of signal point maps, said method comprising the steps of:

deriving a plurality of signal point maps each having a plurality of signal points associated therewith; and determining an estimated total average power associated with data transmission using said signal point maps, wherein said determining step includes calculating the probability of transmission associated with said signal points by utilizing a uniform probability expression for each of said signal points.

4. A method according to claim 1, wherein said multiple modulus conversion scheme is configured such that relatively larger index values associated with one of said signal point maps are generated less often than relatively smaller index values associated with said one of said signal point maps.

5. A method according to claim 1, wherein said arranging step is responsive to an adaptive analysis of at least one cost function associated with said PCM modem system.

6. A method according to claim 1, wherein said arranging step is configured to optimize transmit power associated with transmission of signal points associated with said at least one signal point map.

7. A method for signal point mapping in the context of a pulse code modulation (PCM) modem system, said method comprising the steps of:

generating a plurality of index values with a multiple modulus encoder configured to perform a multiple modulus conversion (MMC) procedure on a number of input bits;

reordering said index values in accordance with an optimizing function to obtain a plurality of reordered index values;

applying said reordered index values to a plurality of signal point maps to identify a plurality of codewords associated with said signal point maps; and transmitting a plurality of symbols corresponding to said codewords;

wherein said optimizing function is configured to optimize transmit power associated with transmission of said symbols based on a probability of occurrence for each of said plurality of codewords.

8. A method according to claim 7, further comprising the steps of obtaining a plurality of moduli associated with said MMC procedure;

rearranging the order of said moduli in accordance with said optimizing function to obtain a plurality of reordered moduli; and inputting said reordered moduli into said multiple modulus encoder, said generating step being responsive to said reordered moduli.

9. A method according to claim 8, wherein said reordering and rearranging steps are configured to designate specific ones of said signal point maps for use with transmission of specific symbols within a data frame.

10. A method according to claim 8, further comprising the step of performing an adaptive constellation design to obtain a signal points for said signal point maps, wherein said reordering and rearranging steps are responsive to said performing step.

11. A method for signal point mapping design in the context of a pulse code modulation (PCM) modem system that employs a multiple modulus conversion (MMC) procedure associated with a plurality of moduli to perform signal point mapping using a number of signal point maps, said method comprising the steps of:

deriving a plurality of signal point maps each having a plurality of signal points associated therewith;

obtaining a bit count associated with a number of bits to be processed by a multiple modulus encoder;

generating a plurality of output values with said MMC procedure in response to a predetermined binary input;

calculating the probabilities of transmission associated with said signal points, where the probability of transmission of said signal points is nonuniform; and determining a total average power associated with data transmission using said signal point maps and utilizing said plurality of output values;

wherein said determining step determines said exact total average power in response to said probabilities of transmission.

12. A method according to claim 11, wherein:

said calculating step calculates the probability of transmission of each signal point associated with a plurality of signal point maps; and said method further comprises the step of obtaining a transmission power associated with each of said signal point maps.

13. A method according to claim 2, wherein:

said MMC procedure is performed for a binary input of B bits; and said predetermined binary input represents the integer $2^B - 1$.

14. A method according to claim 2, wherein:

said PCM modem system transmits L symbols per data frame;

said MMC procedure produces said plurality of output values in response to an input of B bits;

said method further comprises the steps of:

defining $P_k$ for values of k, where:

$$P_k = \prod_{i=0}^{k} M_i, \forall\, 0 \le k \le L-1; P_k = 1, \forall\, k < 0,$$

and $M_i$ is the modulus associated with the i-th signal point map;

defining $q_k$ for values of k, where $q_k = \text{INT}(2^B/P_k)$; and defining $c_k$ for values of k, where: $c_k = (2^B - P_k q_k)$ MODULO $P_{k-1}$; and said determining step includes the step of calculating the probabilities of transmission for each signal point contained in said signal point maps utilizing $P_k$, $q_k$, and $c_k$.

15. A method according to claim 3, wherein:

said determining step comprises the steps of defining $P_k$ for values of k, where:

$$P_k = \prod_{i=0}^{k} M_i, \forall\, 0 \le k \le L-1; P_k = 1, \forall\, k < 0,$$

and $M_i$ is the modulus associated with the i-th signal point map;

defining $q_k$ for values of k, where: $q_k = \text{INT}(2^B/P_k)$; and calculating the probability of transmission $p_{k,i}$ associated with the i-th signal point contained in the k-th signal point map, where: $p_{k,i} = P_{k-1}(q_k+1)/2^B$.

* * * * *